July 23, 1963  C. D. JACKSON  3,098,445
AERODYNAMICALLY SUPPORTED ROCKET
Filed June 27, 1960  2 Sheets-Sheet 1
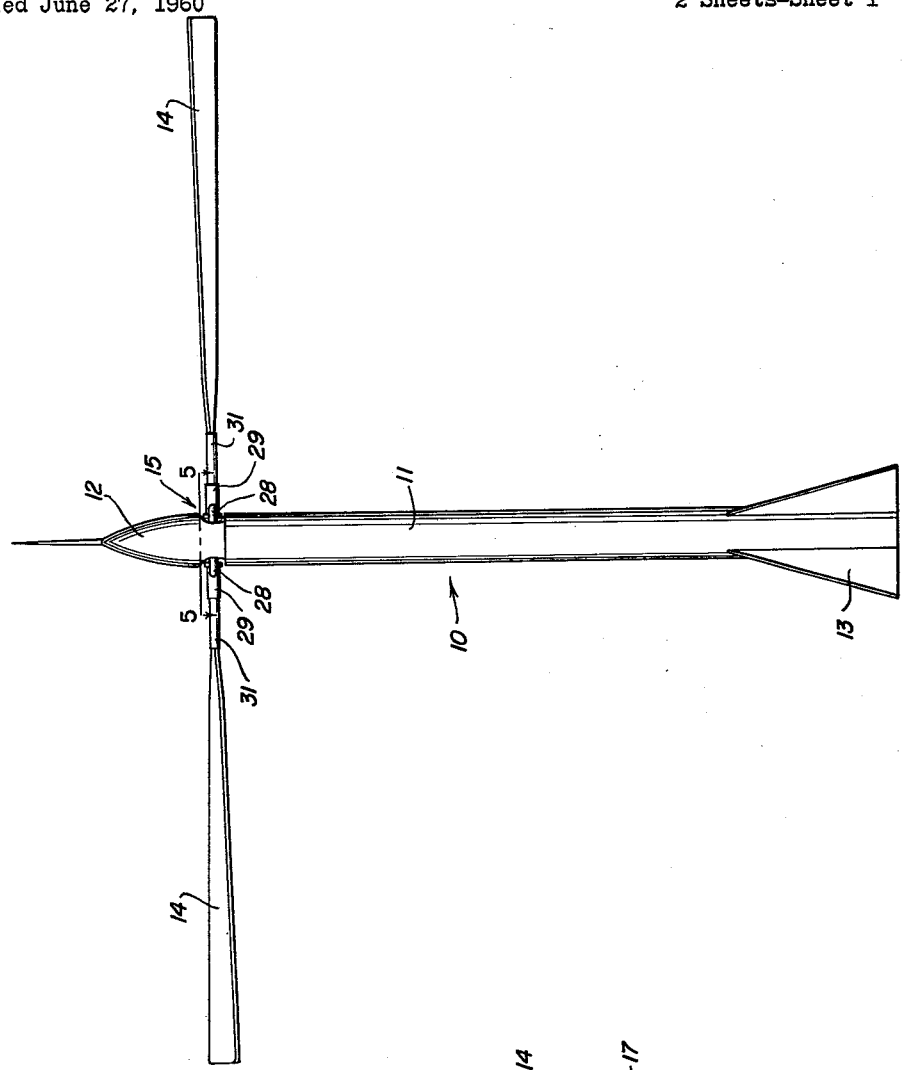
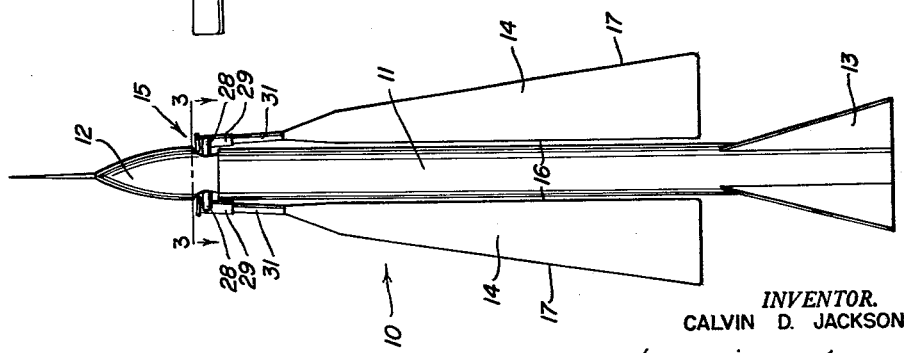
INVENTOR.
CALVIN D. JACKSON
BY *Mallinckrodt and Mallinckrodt*
ATTORNEYS July 23, 1963   C. D. JACKSON   3,098,445
AERODYNAMICALLY SUPPORTED ROCKET
Filed June 27, 1960   2 Sheets-Sheet 2
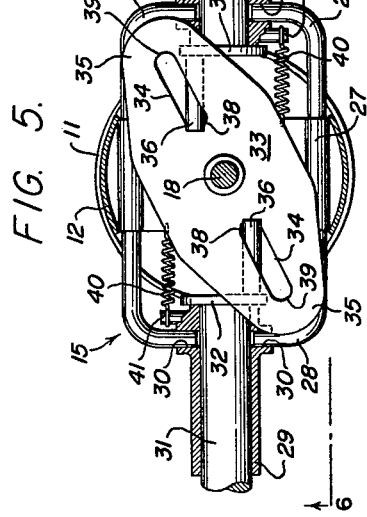
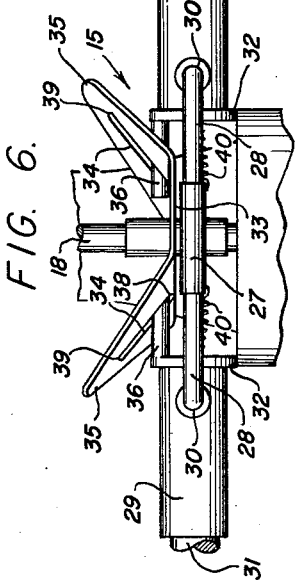
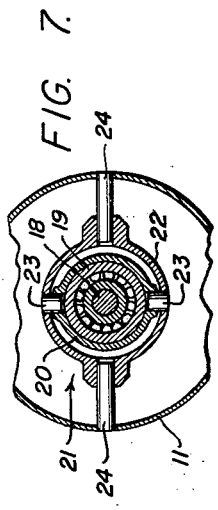
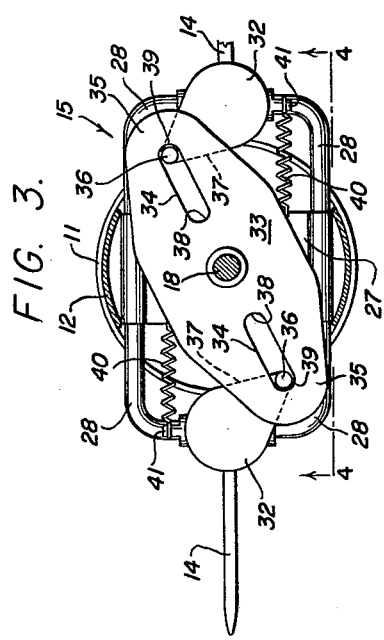
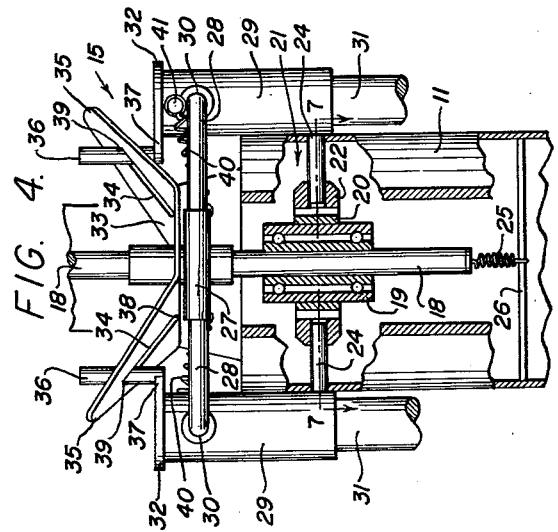
INVENTOR.
CALVIN D. JACKSON
BY *Mallinckrodt and Mallinckrodt*
ATTORNEYS United States Patent Office 3,098,445
Patented July 23, 1963

3,098,445
AERODYNAMICALLY SUPPORTED ROCKET
Calvin D. Jackson, Salt Lake City, Utah, assignor to Auradynamics, Incorporated, Salt Lake City, Utah, a corporation of Utah
Filed June 27, 1960, Ser. No. 38,937
9 Claims. (Cl. 102—49)

This invention relates to rockets, and particularly to those with aerodynamic blades adapted to support the rocket in the atmosphere.

Rockets when fired from the earth and not attaining an orbit in space normally fall rapidly back to earth after the rocket fuel gives out and upward momentum ends. This limits the time available at altitude in the atmosphere for recording data and other useful purposes. In addition, when multi-stage rockets are being used there are times when it would be particularly advantageous to delay firing subsequent rocket stages and this can be especially useful when means is provided for aerodynamic support between rocket stage firings.

It is, therefore, a principal object of this invention to provide aerodynamic blade means for supporting a rocket in atmosphere.

Another object is to provide for minimized resistance to passage of the rocket as it is being fired through atmosphere.

Features in the accomplishment of these objects are a rocket equipped with aerodynamic blades adapted for providing support for the rocket as they rotate through the air, a rotatably mounted hub for the blades, and means for shifting the blades to fin positions extending longitudinally back along the body of the rocket for reduced resistance to passage and for stabilizing purposes as the rocket is being fired headlong through the atmosphere.

A specific embodiment representing what is presently regarded as the best mode of carrying out the invention is illustrated in the accompanying drawings.

In the drawings:

FIG. 1 represents a side elevation of a rocket equipped with aerodynamic blades which are folded back as when the rocket is being fired through atmosphere;

FIG. 2, a side elevation of the rocket of FIG. 1 with the blades extended for providing the rocket with aerodynamic support by rotative passage through the air;

FIG. 3, a horizontal section taken on the line 3—3 of FIG. 1;

FIG. 4, a fragmentary vertical section taken on the line 4—4 of FIG. 3;

FIG. 5, a horizontal section taken on the line 5—5 of FIG. 2;

FIG. 6, a fragmentary vertical section taken on the line 6—6 of FIG. 5; and

FIG. 7, a fragmentary horizontal section taken substantially on line 7—7 of FIG. 4.

Referring to the drawings:

In the illustrated embodiment, a rocket 10 having an elongate body 11 terminating in a nose cone 12 at one end and a tail 13 at the other end is provided with aerodynamic blades 14. These blades are conveniently mounted at the nose end of body 11 by a novel hub structure 15 which normally holds blades 14 radially extended (see FIG. 2) for aerodynamic support, as by autorotation, to retard descent of the rocket. Blades 14 may be power driven, if desired, in which event the rocket may maintain altitude in the atmosphere and may even gain additional altitude.

Even through the main purpose of the invention is to provide aerodynamic support for a rocket in atmosphere, air resistance of blades 14 must be minimized during the firing period of rocket 10 and while momentum carries the rocket to higher altitudes. To this end, hub structure 15 is arranged for the folding of blades 14 to a fin position extending longitudinally back along the rocket body 11 with the edge 16 of each blade adjacent body 11 and the blade edges 17 radially outward (see FIG. 1).

Hub structure 15 is mounted in the rocket body 11 by a hub shaft 18 which is fastened, as by a press fit, in bearing 19 (see FIGS. 4 and 7). Bearing 19 is advantageously mounted in the inner cage 20 of a gimbal 21 also having an outer cage 22. Inner cage 20 is pivotally mounted within outer cage 22 by pivot pins 23 and the outer cage 22 is pivotally mounted in rocket body 11 by pivot pins 24 with a pivot axis substantially at right angles to the pivot axis of the inner cage 20. This provides for universal pivoting action of hub shaft 18, hub structure 15, and blades 14 about the pivot center of gimbal 21 in customary gimbal action. Spring 25 is connected to the end of hub shaft 18 and to the member 26 of rocket body 11 in order to resiliently urge return of the shaft 18 whenever it is pivoted from the center position shown in FIG. 4.

A relatively heavy and sturdy frame plate 27 of hub structure 15 is fixed to hub shaft 18 for rotation therewith. Frame plate 27 not only mounts nose cone 12, but is advantageously provided with frame extensions 28. These are used to pivotally mount sleeves 29 by projecting into respective sleeve openings 30. This provides a pivotal mounting not only for sleeves 29 but also for blades 14, respective circular hubs 31 of which are journalled within the sleeves 29. Shoulders 32 of blade hubs 31 contact the inner ends of sleeves 29 to hold the hubs in the sleeves and mount blades 14 in hub structure 15.

A cam plate 33 having two cam slots 34 is fixed to hub shaft 18 as a part of hub structure 15. Cam slots 34, which are provided in opposite upwardly and outwardly extended tabs 35 of cam plate 33, receive cam arms 36 of the respective blades 14. Cam arms 36 project from eccentric ears 37 of respective blade hub shoulders 32 in eccentric relation to the rotational axis of blade hubs 31 as journalled in sleeves 29. Cam slots 34 and cam arms 36 are conveniently arranged to control the angular positions of blades 14. When blades 14 are pivoted about the pivotal mounting of sleeves 29, from the folded state of FIG. 1 to the radially extended state of FIG. 2, cam arms 36 engage the bottoms 38 of cam slots 34 to rotate the blades to the proper angular positions or attitude for providing aerodynamic support by rotation. On the other hand, as blades 14 are pivoted to the folded state of FIG. 1, cam arms 36 engage the tops 39 of cam slots 34 to advantageously rotate the blades to the fin position.

Blades 14 are biased outwardly from the folded state of FIG. 1 by springs 40 which are conveniently mounted on the frame plate 27 and are connected to the arms 41 of respective sleeves 29. Arms 41 are positioned above the pivot mounting of sleeves 29 provided by frame extensions 28 and sleeve openings 30 in order to give leverage for the springs 40 in initiating movement of blades 14 from the folded state. However, springs 40 are chosen of such resilient tension that, as long as the rocket 10 is moving rapidly ahead through atmosphere, blades 14 will be held in the folded state by air resistance. This arrangement advantageously insures rapid conversion of blades 14 to the changed attitude state of FIG. 2 for aerodynamic support whenever needed by moving blades out sufficiently for the air to catch them as rocket 10 starts falling back and thereby complete the blade unfolding movement.

Whereas there is here illustrated and described a preferred construction which I presently regard as the best mode of carrying out my invention, it should be understood that various changes may be made without departing from the disclosed inventive subject matter particularly pointed out and distinctly claimed herebelow.

I claim:

1. A rocket comprising an elongate body having a nose portion; aerodynamic blades having hub sections; a rotatably mounted hub structure at the nose portion of said rocket body for mounting said blades; means rotatably mounting said hub structure on an axis extending longitudinally of the rocket body; means pivotally and rotatably mounting said blade hub sections in said hub structure on respective, angularly related, pivotal and rotatable axes transversely disposed with respect to the aforementioned axis to provide retracted and extended positions for said blades; cam means in said hub structure; means projecting from each of said blade hub sections in operative association with said cam means for controlling the attitude of said blades as they are shifted from retracted to outwardly extended positions; and resilient means normally urging said blades outwardly toward aerodynamic positions, said means having insufficient strength to overcome the counterbalancing force of the atmosphere during projected upward flight of the rocket therethrough.

2. The rocket of claim 1, including a nose cone mounted on said hub structure.

3. The rocket of claim 1, wherein the means rotatably mounting said hub structure includes a bearing mounted in said rocket body; and a hub shaft mounted for rotation in said bearing.

4. The rocket of claim 3, wherein a gimbal mount is provided for said bearing in the rocket body.

5. The rocket of claim 1, where the means for pivotally and rotatably mounting said blade hub sections in said hub structure includes sleeves rotatably receiving the hub sections of respective blades and means retaining the blades in the sleeves; and a frame member having projections pivotally mounting said sleeves.

6. The rocket of claim 5, wherein a shoulder is provided on each said blade hub as the means for holding the blade in the respective sleeve.

7. The rocket of claim 6, wherein each said shoulder is eccentrically shaped; and said means projecting from each said blade hub section comprises an arm mounted on the eccentrically extended portion of each said shoulder.

8. The rocket of claim 7, wherein said cam means comprises a plate having cam slots which receive and guide said arms, respectively.

9. In combination with a rocket having an elongate rocket body; a hub structure; means mounting said structure on the rocket body for rotation on an axis extending longitudinally of said body; aerodynamic blades having hub sections; means pivotally and rotatably mounting the hub sections in the hub structure on respective, angularly related, pivotal and rotatable axes transversely disposed with respect to said longitudinal axis, to provide streamlined retracted and aerodynamic outwardly extended positions for said blades; means for outwardly extending said blades from retracted position; and means for rotatably changing the attitude of said blades from streamlined to aerodynamic as they are being moved from retracted to outwardly extended positions.

References Cited in the file of this patent

UNITED STATES PATENTS

| | | |
|---|---|---|
| 2,654,320 | Schmid | Oct. 6, 1953 |
| 2,916,919 | Echolds | Dec. 15, 1959 |

FOREIGN PATENTS

| | | |
|---|---|---|
| 57,093 | Austria | July 15, 1912 |
| 374,247 | Great Britain | May 22, 1931 |
| 400,837 | Italy | Dec. 22, 1942 |